United States Patent [19]

Tansky et al.

[11] Patent Number: 4,928,299

[45] Date of Patent: May 22, 1990

[54] COIN OPERATED TELEPHONE OPERATION MONITORING SWITCH MOUNTING ARRANGEMENT

[75] Inventors: John L. Tansky, Sewell, N.J.; Edward F. Lagan, Jr., Downingtown; Patrick J. McGarry, West Chester, both of Pa.

[73] Assignee: Mars Incorporated, McLean, Va.

[21] Appl. No.: 357,762

[22] Filed: May 26, 1989

[51] Int. Cl.⁵ .......................................... H04M 17/00
[52] U.S. Cl. ...................................... 379/37; 379/143; 340/568
[58] Field of Search ................... 379/39, 106, 37, 143, 379/155; 340/568

[56] References Cited

U.S. PATENT DOCUMENTS 3,213,210 10/1965 Samples .............................. 329/143
4,123,623 10/1978 McElliott ............................ 340/568

*Primary Examiner*—Stafford D. Schreyer
*Attorney, Agent, or Firm*—Davis Hoxie Faithfull & Hapgood

[57] ABSTRACT

An event monitoring system for payphones is described. Particularly, an arrangement for monitoring events such as the removal of the front cover, vault door and coin box is described. Sensors attached to brackets generate signals indicative of front cover, vault door and coin box removal are sensed by a monitoring circuit and sent to a central telephone office as appropriate. The brackets allow easy mounting of the sensors using existing payphone housing hardware, surfaces and cutouts. Consequently, this mounting arrangement may be used to retrofit standard payphones using only pre-existing mounting locations and holes to include event monitoring capability. The sensors and monitor circuit operate on low power and may be designed to operate in the absence of payphone power.

17 Claims, 7 Drawing Sheets

COIN OPERATED TELEPHONE OPERATION MONITORING SWITCH MOUNTING ARRANGEMENT

BACKGROUND OF THE INVENTION

1. Field of the Invention

The present invention relates to an arrangement designed to improve the ability of payphones to collect accounting data and to monitor payphone events by providing sensors to monitor events such as the removal of the front cover, vault door and coin box. In a preferred embodiment, specially designed brackets containing low power sensors are used to retrofit pre-existing standard hardware to have data or event monitoring capacity. These brackets and sensor arrangements use pre-existing openings and mounting screws located within standard payphone housings thereby allowing easy retrofitting.

2. Description of the Prior Art

It has long been recognized that it is desirable to monitor payphone events and to collect data for audit purposes and the like. For example, it is desirable to be able to monitor both the time and fact of the opening or removal of the vault door which provides a serviceman access to the coin box, as well as removal of the coin box itself.

Additionally, it is desirable to monitor the removal of the front cover which is located above the vault door. Circuits controlling payphone operation are located behind this cover, and a repairman gains access to those circuits by removing this cover.

U.S. Pat. No. 4,567,325 discloses a controller for a coin operated telephone set which incorporates automatic trouble reporting circuitry. A stuck coin indication is provided to a central office, while a microcomputer checks the telephone circuitry and coin chute to determine if they are operational. If they are deemed non-operational, then the stuck coin signal remains until a repair visit corrects the situation. The circuitry described does not monitor the front cover, vault door or coin box. Additionally, the circuits are not described as being low-power and further would apparently not operate if payphone power is cut.

U.S. Pat. No. 4,625,078 discloses a method for fraud prevention in an electronic telephone set. A local memory for storing coin deposit information and generating coin deposit signals is disclosed. This memory is said to be capable of being interrogated remotely by a central office. A cash box detector comprising a mechanical switch which changes state each time a cash box vault door is removed, is described. Additionally, three infrared LED-phototransistor pairs monitor coins entering and leaving the coin chute, and a hopper-overflow LED senses cash box overflow. These optical sensor arrangements may be unreliable, however, because of problems associated with optical sensors such as fouling due to dirt, and require a constant supply of power in order to operate to detect the occurrence of an event.

SUMMARY OF THE INVENTION

A system to inform the telephone company when a payphone is being serviced or repaired is needed. Similarly, an improved payphone event monitoring system is needed. The present invention provides a dependable, low power and economical event monitoring system for use in existing or new payphones.

One aspect of the present invention consists of three independent proximity sensors and the brackets on which they are attached. The brackets mount to already existing hardware located in the payphone and the sensors monitor the removal of the front cover, vault door and coin box.

A single bracket containing both a front cover sensor and a vault door sensor bracket is mounted to a mounting deck located over the coin box compartment and behind the front cover. A single screw is used to secure the bracket to an already existing mounting location. Two magnetic proximity switches are secured to this bracket, the first monitors the removal of the front cover, and the second monitors the removal of the vault door.

The vault door sensor is positioned just inside the front cover of the payphone to sense the movement of the vault door latch. A first proximity switch mounted to the bracket along with an actuator mechanism responds to the opening and closing of the vault door latch. A signal is generated when the latch is turned in order to unlock the vault door. The fact and time of occurrence of this signal may be sent to a central telephone office or to any preprogrammed telephone number.

A second sensor, mounted on the same bracket as the first sensor, is positioned to detect the removal of the front cover. When the front cover is removed the second sensor generates a signal, the fact and time of occurrence of which may also be sent to the central office of the telephone company or any preprogrammed telephone number.

A third sensor to detect removal of the coin box is attached to a coin box bracket which is mounted to two existing mounting screws in the coin box compartment. When the coin box is removed the third sensor similarly generates a signal which may be sent to the central office of the telephone company or any preprogrammed number.

A monitor circuit connected to each sensor is responsible for sending a signal to the central office when it is warranted. The telephone company may use the signals to perform a variety of audit functions.

The present invention provides an economical method and apparatus for improving payphones which can easily be added to existing payphones which do not have the capacity to monitor certain events. The sensors of the present inventions are mounted on brackets which can be used to easily retrofit any standard payphone housing using existing mounting locations. No new holes need be drilled for wiring connections or other purposes as already existing holes are used.

DETAILED DISCUSSION

Figure 1:
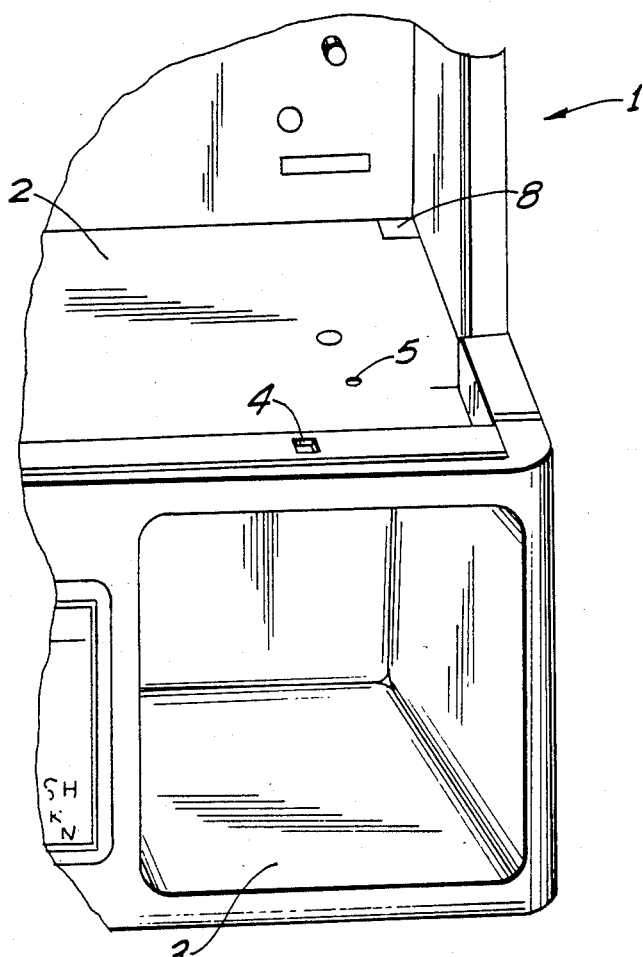
FIG. 1 is a cutaway view of the lower right portion of a payphone in which the present invention is used.

A coin box located in the bottom of a payphone collects coins from customers who place calls. A vault door must be removed to gain access to the coin box. A front cover, located above the vault door protects the payphone circuitry and also permits access by repairmen. A key lock must be opened to gain access.

In one embodiment of the present invention, sensors are provided to monitor the front cover, vault door and coin box of a payphone. The brackets containing the sensors are specially designed to fit existing payphone mounting locations and existing cut outs in the payphone are used as wiring passageways so that no modifications are required to attach the system to the payphone.

The following description of the preferred embodiment describes brackets designed to attach to existing mounting hardware in standard Western Electric payphones or for inclusion in other payphones built to standard specifications. It should be understood that the brackets could be redesigned by one skilled in the art to retrofit other brands of existing payphones.

Additionally, the arrangement according to the preferred embodiment utilizes low-power proximity switches and actuators containing permanent magnets. The proximity switches are sensitive to the presence or absence of magnetic fields such as those provided by a permanent magnet. The switch presently used is an Aleph International Model PS 520 Type-C reed relay. While operationally satisfactory, this switch may be more expensive than desirable for some applications and could be replaced with a less expensive reed relay switch, or where low power operation is not critical, any other type of event sensing switch. In the preferred embodiment, the proximity switches are mounted so that their position can be easily adjusted to compensate for tolerances in the payphones mounting holes and the like, and to still achieve proper alignment. This facilitates easy installation in the field.

Operation of these switches is described below by way of the example of sensing opening of the front cover. When the front cover is in place, a permanent magnet is in close proximity to the front cover proximity switch so that reed connectors in the switch are forced apart, opening a circuit. When the front cover is removed the magnet moves away from the proximity sensor, allowing the reed connectors to close which sends a signal indicative of front cover removal. Alternatively, the reed connectors could close a circuit when the permanent magnet is in close proximity, and open when the reverse is true. These proximity switches operate utilizing no power and are consequently extremely dependable since they can operate even if the power lines are cut. Only a small amount of power is necessary to sense opening or closing of the proximity switch.

The present invention is presently preferably used in conjunction with control circuitry of the type found in U.S. application Ser. No. 199,129 entitled "Low Power Control Apparatus For A Coin Operated Telephone" filed on May 26, 1988, assigned to the assignee of the present invention, and incorporated by reference herein. However, the present invention could also be readily used with other controllers. Each of the sensors is connected to a monitor circuit (explained below in conjunction with FIG. 5) which is responsible for sending a message to the central office or any preprogrammed telephone number when conditions warrant.

Turning to the drawings, FIG. 1 is a cutaway view of the lower right portion of a payphone 1 to which the monitoring switch mounting arrangement of the present invention can be added. Utilizing the present invention, payphone 1 is retrofit with monitoring switches to monitor a variety of events such as front cover removal, vault door removal and coin box removal. A mounting deck 2 is located above a coin box compartment 3 which typically includes a coin box 59 (shown in FIG. 4C). Normally, a front cover 35 (shown in FIG. 3C) is locked in place over the mounting deck 2 to protect payphone circuitry, and a vault door 20 (shown in FIG. 2D) is placed over the coin box compartment and locked. A mounting hole 5 is used by the present invention to mount a first bracket containing both the front cover and vault door sensors, as explained below in conjunction with FIG. 2C. Pre-existing square hole 4 is used by a vault door sensor assembly to monitor the vault door latch (not shown), as explained below in conjunction with FIG. 2D.

A coin box switch assembly mounted on a second bracket is retrofit into the coin box compartment 3. Pre-existing hole 8 is used to route wires from the coin box switch to a monitor circuit 510 (shown in FIG. 5).

The operation of the magnetic switch bracket assemblies of the present invention to monitor the front cover, vault door and coin box of a standard payphone housing will now be explained in detail. FIGS. 2A to 2D depict front cover and vault door bracket assembly 10 and illustrate its mounting in a standard payphone 1.

Figure 2B:
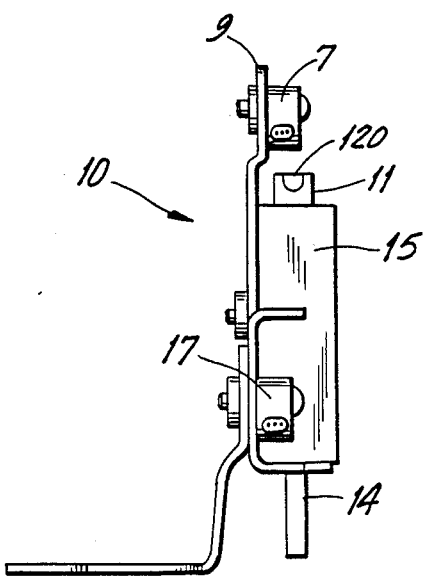
FIG. 2B is a side view of the assembly of FIG. 2A.
Figure 2A:
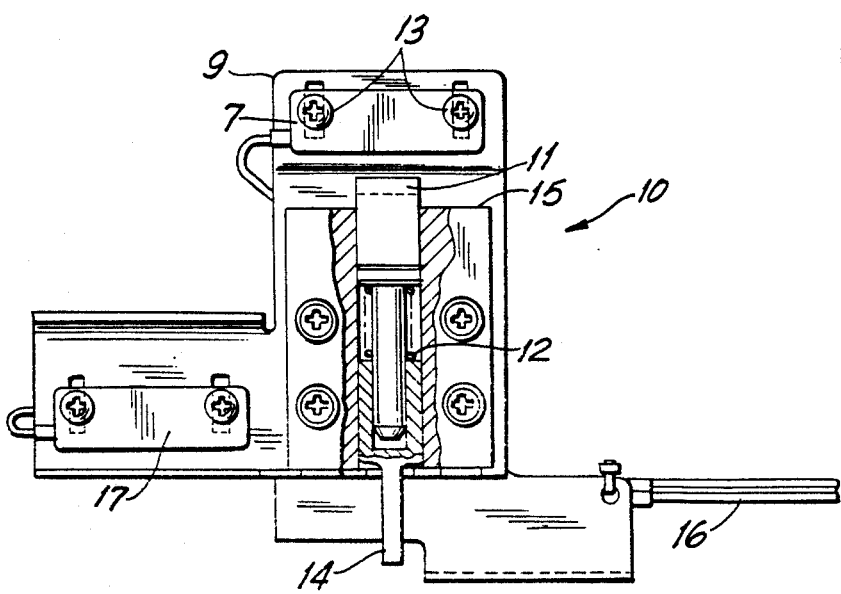
FIG. 2A is a front view of the front cover and vault door sensor bracket assembly.

FIG. 2A is a front view of the front cover and vault door sensor bracket assembly 10. In this assembly 10, a vault door proximity switch 7 is attached to a bracket 9 by two pan head screws 13. A plunger 11, a compression spring 12, and an actuator are connectably aligned within a plunger guide 15. As pressure is applied to actuator 14 in the upward direction, plunger 11 also moves upwards to make contact with proximity switch 7.

A front cover proximity switch 17 is also attached to bracket 9. The actuator which interacts with the front cover proximity switch 17 is mounted to the front cover 35, as will be explained below in conjunction with the discussion of FIG. 3C. Leads 16 from front cover switch 17 and vault door switch 7 are connected to the monitor circuit 510 (shown in FIG. 5).

FIG. 2B is a side view of the front cover and vault door sensor bracket assembly 10 of FIG. 2A. In FIG. 2B, a permanent magnet 120 is visible. This magnet 120 is bonded or otherwise attached to the plunger 11 for use with the vault door proximity switch 7. Actuator 14 fits through hole 4 of FIG. 1 to contact the vault door latch 19 (shown in FIG. 2D). When the vault door is locked, the vault door latch 19 pushes actuator 14 upwards, plunger 11 contacts proximity switch 7 and magnet 120 comes in proximity to the switch 7, thereby opening switch 7. When the latch 19 is opened, actuator 14 and plunger 11 move downwards causing the magnet 120 to move away from proximity switch 7, thereby closing switch 7. This switch closure functions to alert the monitor circuit of a vault door opening.

Figure 2D:
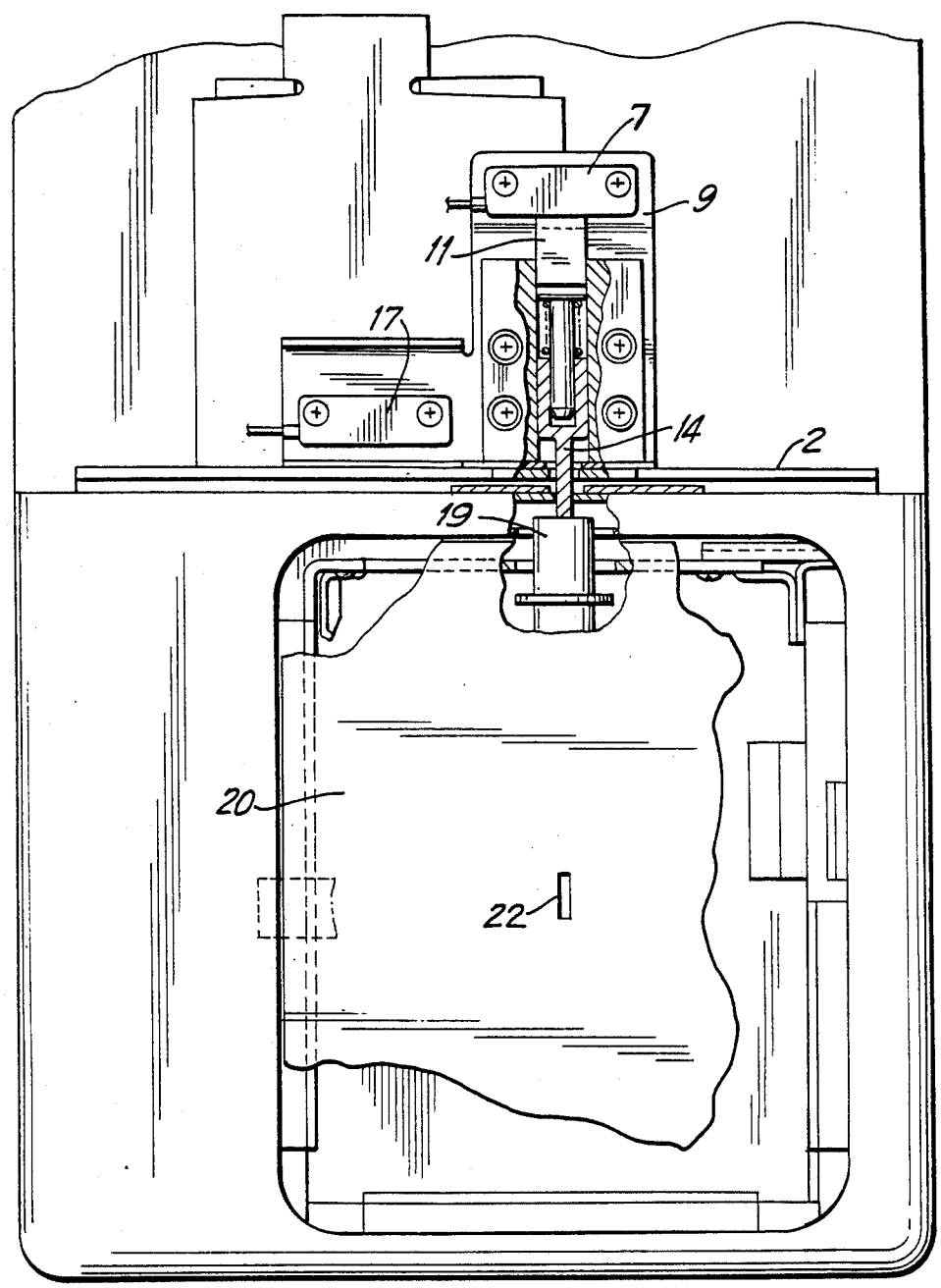
FIG. 2D is a cutaway view of the lower portion of a payphone in which the assembly of FIG. 2A is mounted.
Figure 2C:
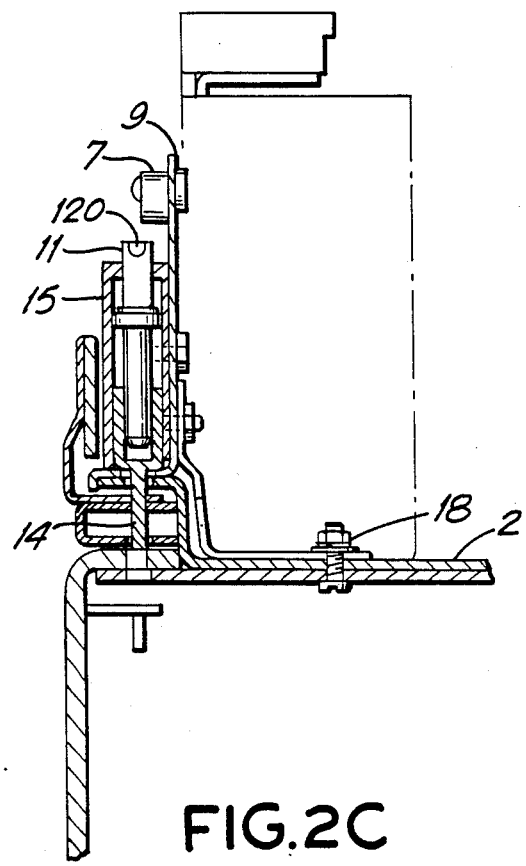
FIG. 2C is a side view of the assembly of FIG. 2A, showing a cutaway view of the assembly mounted to the mounting deck.

FIG. 2C is another side view of the bracket 9 of FIG. 2A shown mounted to the mounting deck 2 by a single screw 18 in conjunction with a washer, lock washer and nut. Screw 18 passes through the mounting hole 5. The vault screw normally used in standard payphone housings is replaced by the longer slotted screw 18 in order to mount the bracket 9 containing the vault door and front cover sensors. In the presently preferred embodiment, this change to a longer screw is the only hardware change to the hardware of the standard payphone.

FIG. 2D is a cutaway view of the lower portion of payphone 1 in which the brackets and sensors of the present invention are mounted. The bracket 9 containing the front cover switch 7 and vault door switch 17 is mounted on the mounting deck 2. The actuator 14 contacts the vault door latch 19 through an existing opening 4, as best seen in FIG. 1. The vault door latch 19 is part of the vault door lock (not shown) which is accessed by a key in a keyhole 22 to remove the vault door 20.

FIG. 2D depicts the vault door 20 in a locked position. When locked, the vault door latch 19 contacts the actuator 14 and supplies pressure in the upward direction so that plunger 11 contacts the vault door proximity switch 7. Permanent magnet 120 (best seen in FIGS. 2B and 2C) is then close to the proximity switch 7. When the vault door is open, the vault door latch 19 moved downward, causing actuator 14 to also move downward so that plunger 11 disengages from the proximity switch 7.

Figure 3A:
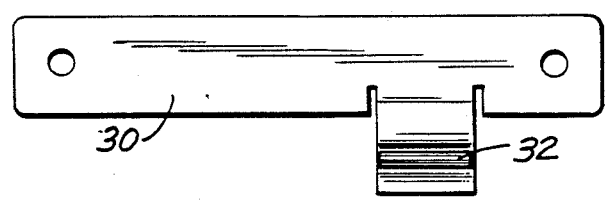
FIG. 3A depicts the front cover magnetic bracket.
Figure 3B:
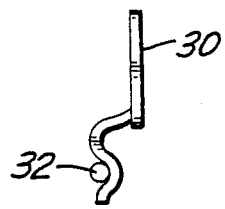
FIG. 3B is a side view of the bracket of FIG. 3A.
Figure 3C:
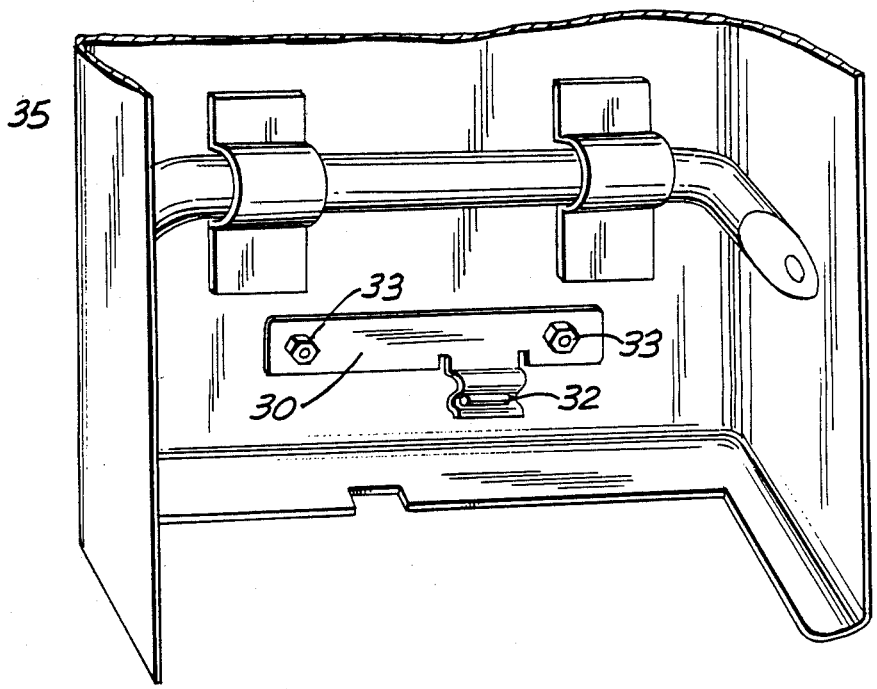
FIG. 3C depicts the front cover of a payphone with the bracket of FIG. 3A mounted inside.

Front cover proximity switch 17 requires a permanent magnet mounted to the front cover in order to sense front cover removal. FIGS. 3A and 3B depict a front view and side view respectively, of a front cover magnet mounting bracket 30. FIG. 3C depicts the bracket 30 mounted to the inside of the front cover 35 to an existing mounting location by hex nuts 33.

Figure 3D:
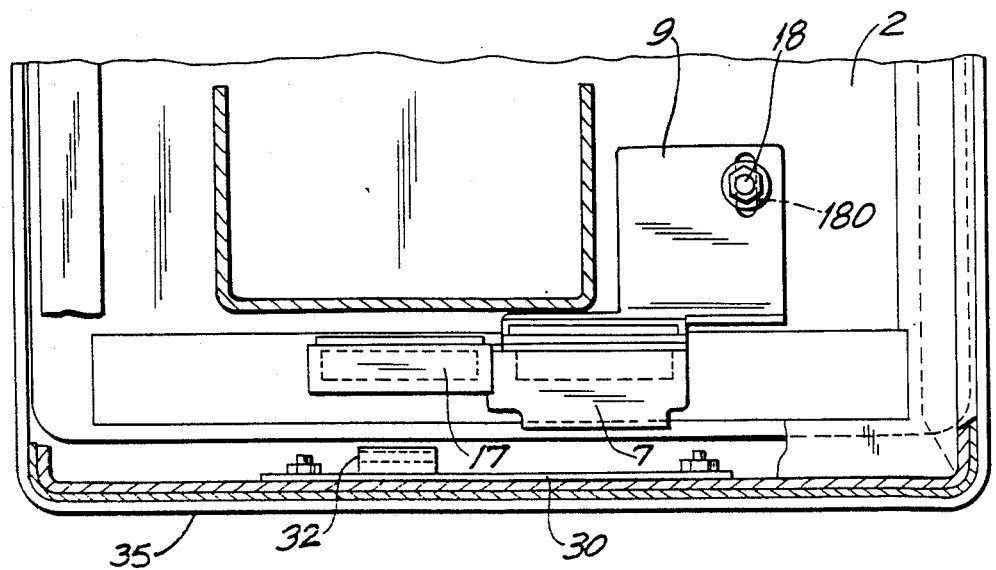
FIG. 3D is a cutaway top view of the brackets of FIGS. 2A and 3A mounted to the payphone in order to show the relationship of the components.

When the front cover 35 is fitted to the payphone, a permanent magnet 32 is positioned close to the front cover proximity switch 17 of the bracket 9 of FIG. 2A. A cutaway top view depicting the relationship of the magnet 32 to the switch 17 is shown in FIG. 3D. The front cover 35 is shown in place, with permanent magnet 32 of the front cover magnetic bracket 30 located next to proximity switch 17 of bracket 9. When the front cover 35 is removed the proximity switch 17 reacts to the removal of the magnet 32 generating a signal indicative of front cover removal.

Figure 4A:
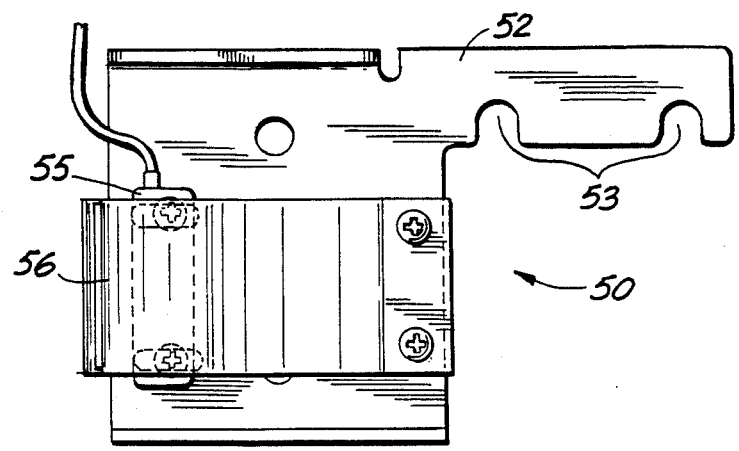
FIG. 4A is a front view of the coin box switch assembly.
Figure 4B:
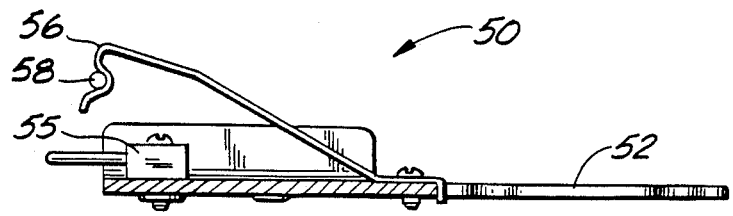
FIG. 4B is a side view of the assembly of FIG. 4A.

A third sensor to monitor coin box removal is mounted in the coin box compartment 3 shown in FIG. 1. FIG. 4A is a top view and FIG. 4B is a side view of a coin box switch assembly 50. A coin box mounting bracket 52 contains slots 53 that fit preexisting mounting screws of the existing lock assembly found in the coin box compartment of a standard Western Electric type payphone. A proximity switch 55 and actuator 56 attached to the bracket 52 are disposed to sense the presence or absence of the coin box (shown in FIG. 4C).

Actuator 56 contains a permanent magnet 58 for use with the proximity switch 55, as will be explained below in conjunction with FIG. 4C.

Figure 4C:
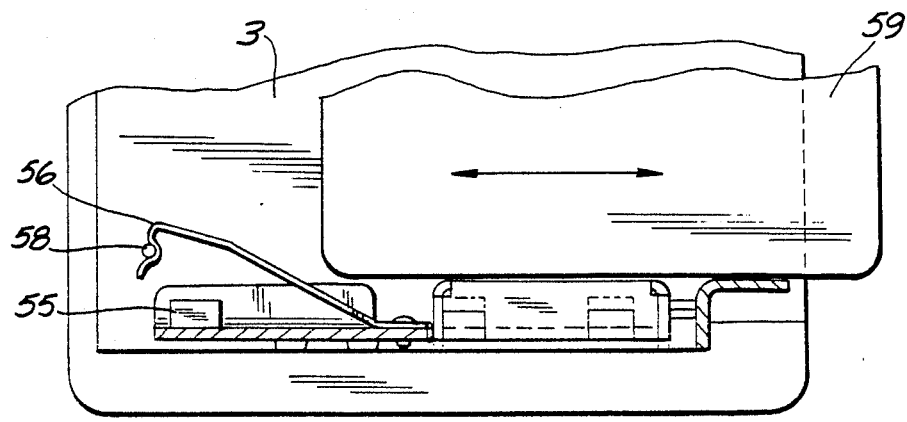
FIG. 4C is a cutaway view of a payphone coin box compartment depicting the relationship of the coin box to the assembly of FIG. 4A.

FIG. 4C is a cutaway view of the payphone coin box compartment 3 containing the coin box switch assembly 50 and illustrates the insertion or removal of a coin box 59. The actuator 56 depicted in FIG. 4C is in the open position indicating the absence of the coin box. However, when the coin box is pushed all the way into the coin box compartment, the actuator 56 is pressed towards the proximity switch 55, positioning permanent magnet 58 adjacent to the switch 55. When the coin box is removed, the actuator moves magnet 58 away from proximity switch 55, opening or closing a circuit to create a signal indicative of coin box removal.

Figure 5:
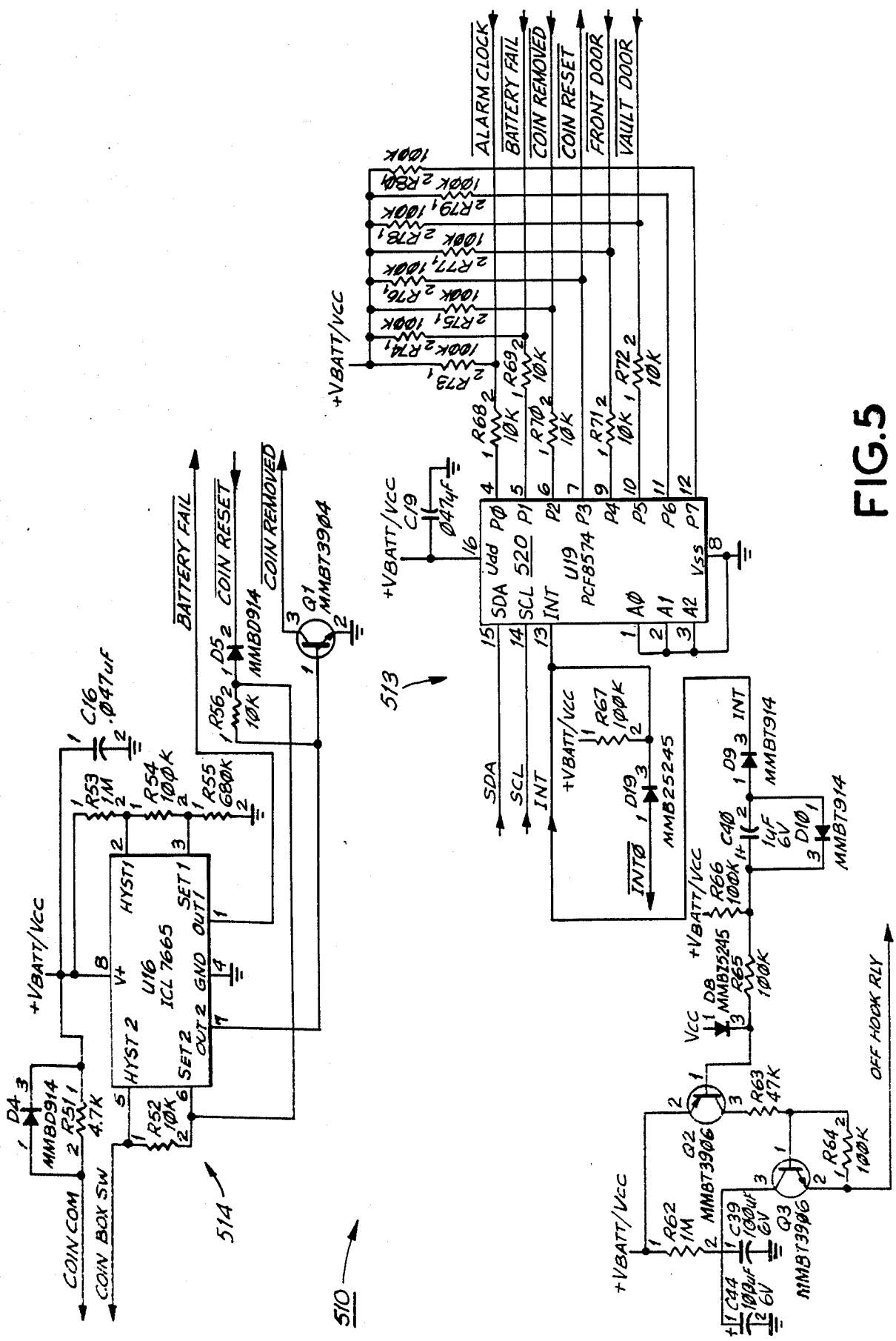
FIG. 5 is a circuit diagram of a monitor circuit which is used with the present invention.

The three sensors of the present invention create signals sensed by a monitor circuit. These signals indicate front cover, vault door and coin box removal. FIG. 5 is a circuit diagram of the presently preferred monitor circuit 510 for use with the present invention. The monitor circuit 510 examines the proximity switches and when necessary, initiates a call to the central office or any preprogrammed number. For a more detailed discussion of the operation of this circuit see U.S. Ser. No. 199,129 referred to above. Other suitable monitoring circuits for use in sensing the proximity switches could be readily devised using routine skill in the art.

Figure 6:
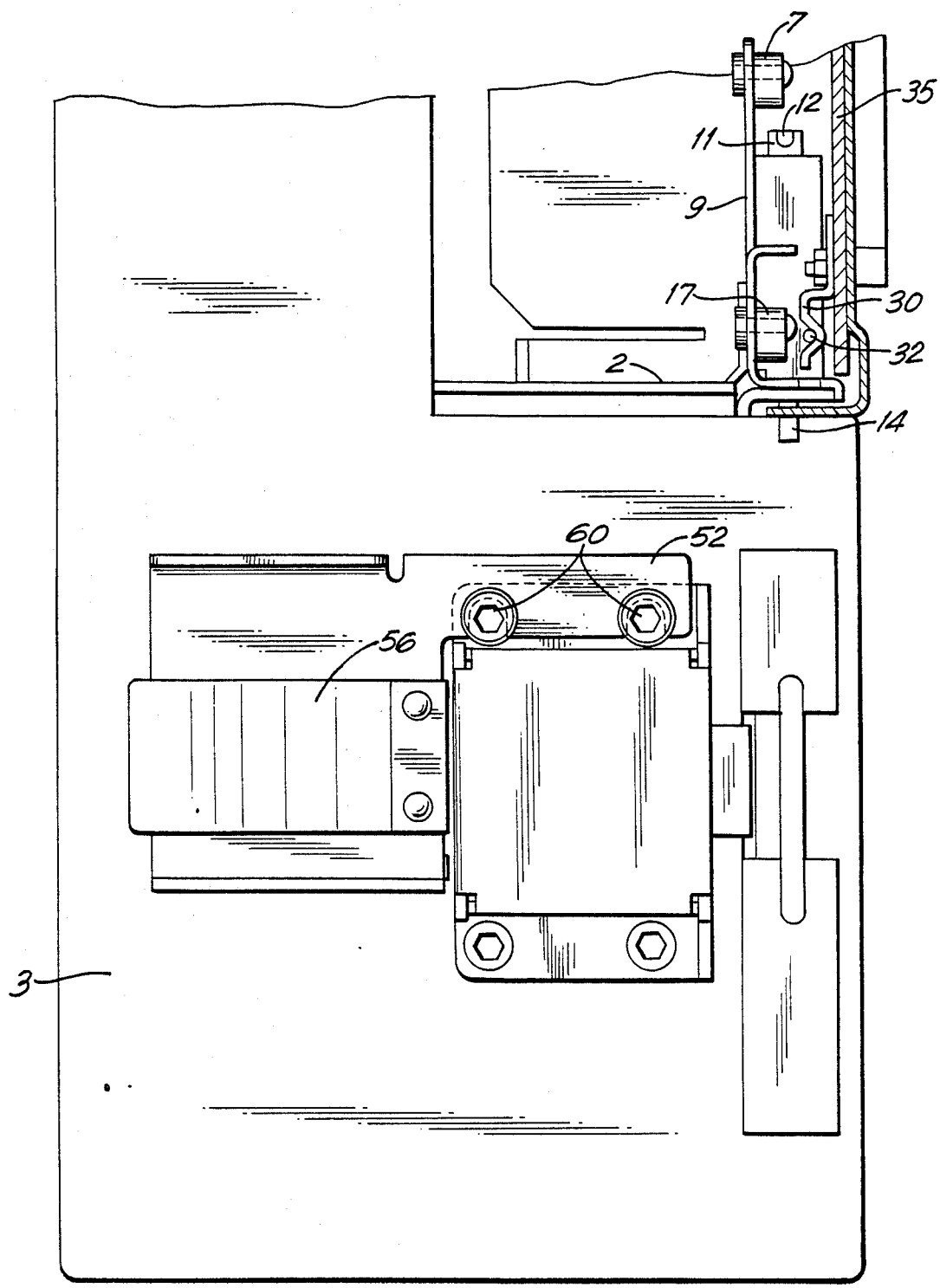
FIG. 6 is a cutaway side view of a lower portion of a payphone depicting the location of the mounted sensor switch assemblies of FIGS. 2A, 3A and 4A.

According to the present invention, any one sensor or combination of sensors can be added to a standard payphone. FIG. 6 is a cutaway side view of a lower portion of payphone 1 illustrating the positions of each of the mounted bracket sensor assemblies of the present invention. The front cover and vault door bracket 9 is mounted to the mounting deck 2 using a single screw (not shown) behind front cover 35. The front cover magnet bracket 30 is mounted to the front cover 35 so that permanent magnet 32 is adjacent to the front cover proximity switch 17 when the cover is in place.

In FIG. 6, the vault door is removed and the vault door latch is open so that actuator 14 is not in contact with the latch. Plunger 11 and permanent magnet 120 are therefore not in close proximity to the vault door proximity switch 7, indicating a vault door open condition.

Also depicted in FIG. 6 is the mounting of the coin box sensor bracket 52 to the bulk head in the coin box compartment 3, using existing mounting screws 60 and lock washers and nuts. The actuator 56 is pushed towards the proximity switch located beneath it when the coin box (shown in FIG. 4C) is inserted.

The bracket and sensor assemblies of the present invention provide an event monitoring system for use in standard payphones. These assemblies are easy to install because they can be mounted using pre-existing mounting locations and are readily adjusted if mounting slots, such as slot 180 (shown in phantom lines in FIG. 3D) are employed. Such slots are presently preferred to allow ready adjustment. While a preferred arrangement of sensors has been described, allowing a central office or any preprogrammed number to be informed when the coin box, vault door or front cover has been removed so that appropriate action may be taken, it should be appreciated that more or less sensors may be employed depending upon the application. The presently preferred sensors can operate even if power to the payphone has been cut. This makes for a dependable system.

We claim:

1. A payphone event monitoring system which may be readily installed in a standard payphone housing using preexisting payphone cutouts and which generates signals indicative of the removal of a coin box, a vault door or a front cover, comprising:
   (a) a first sensor bracket assembly to which is attached a front cover sensor and a vault door sensor;
   (b) a second sensor bracket assembly, containing a coin box sensor; and
   (c) a means for monitoring the sensors and sending a signal indicative of removal of the coin box, vault door or front cover.

2. The apparatus of claim 1, wherein the sensors for the vault door and front cover are attached to a single piece bracket which is mounted to a pre-existing location on a mounting deck using a single long screw and nut assembly, said single long screw replacing a pre-existing screw of the standard payphone housing.

3. The apparatus of claim 1, wherein the vault door sensor uses a pre-existing hole in the mounting deck to make contact with a vault door latch in order to sense the opening and closing of a vault door lock.

4. The apparatus of claim 1, further comprising a front cover bracket attached inside of the front cover at a preexisting mounting location on the front cover using pre-existing hex nuts.

5. The apparatus of claim 4, wherein the front cover bracket is positioned opposite the front cover sensor.

6. The apparatus of claim 1, wherein the second sensor bracket assembly is mounted in the coin box compartment to existing screw mounting locations.

7. The apparatus of claim 6, wherein the coin box sensor comprises an actuator and a switch, said actuator being a spring designed to move closer to the coin box sensor when the coin box is in place and away from the sensor when the coin box is removed.

8. The apparatus of claim 1, wherein at least one of said sensors comprises a proximity switch having a reed switch and an actuator.

9. The apparatus of claim 8, wherein the actuator comprises a permanent magnet.

10. The apparatus of claim 1, wherein at least one of said bracket assemblies includes slotted mounting holes so that its sensor can be readily adjusted.

11. The apparatus of claim 1, wherein the sensors are capable of operating in the absence of payphone power.

12. The apparatus of claim 1, wherein the means for monitoring the sensors is a low-power monitor circuit which can send signals indicative of vault door open, front cover open or coin box removal.

13. A method for retrofitting a payphone having a standard payphone housing to include an event monitoring capability comprising the steps of:
   mounting at least one sensor attached to a bracket to a pre-existing mounting location in a standard payphone housing using pre-existing holes in the standard payphone housing;
   using said at least one sensor to generate signals to be sensed by a monitoring circuit;
   sending a signal from the monitoring circuit to a predetermined number indicative of the occurrence of the event.

14. The method of claim 13, wherein the monitor circuit and the at least one sensor operate on low power.

15. The method of claim 14, wherein said sensor is comprised of a proximity switch and a permanent magnet actuator, the proximity switch being sensitive to proximity of the magnet.

16. The method of claim 15, wherein the proximity switch is a reed switch.

17. The method of claim 15, wherein the sensor and the monitor circuit continue to operate if payphone line power is eliminated.

* * * * *